W. C. STEPHENSON.
TOOL HOLDER.
APPLICATION FILED MAR. 13, 1917.
1,314,911.
Patented Sept. 2, 1919.
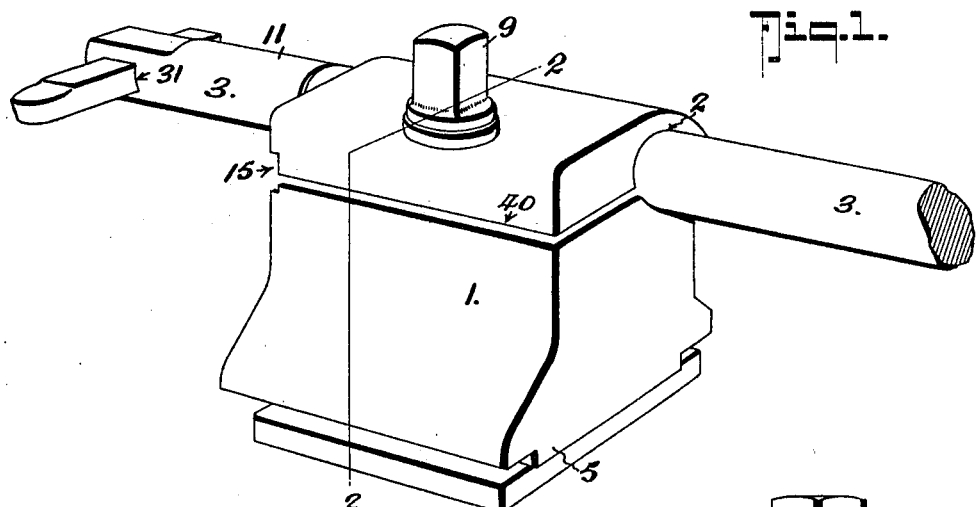
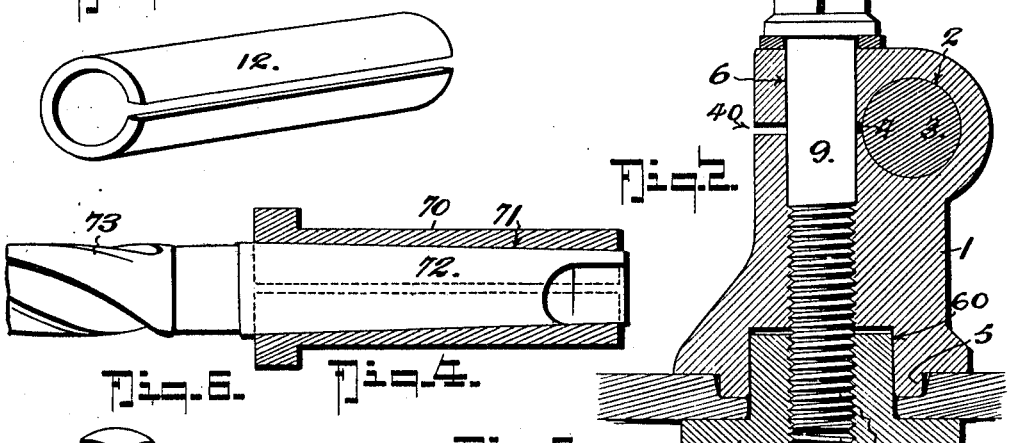
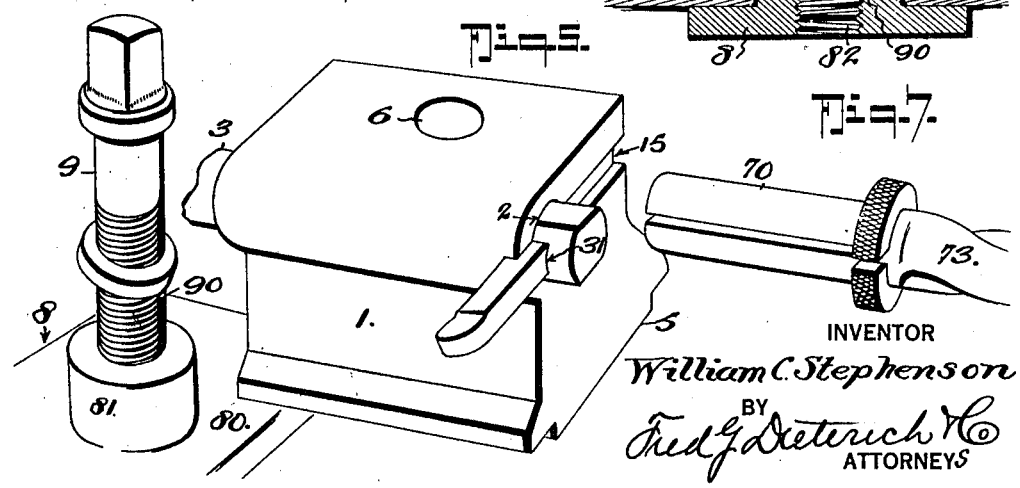
INVENTOR
William C. Stephenson
BY
Fred J. Dieterich & Co
ATTORNEYS

UNITED STATES PATENT OFFICE.

WILLIAM CURRY STEPHENSON, OF ROCKY MOUNT, NORTH CAROLINA.

TOOL-HOLDER.

1,314,911.  Specification of Letters Patent.  Patented Sept. 2, 1919.

Application filed March 13, 1917. Serial No. 154,640.

*To all whom it may concern:*

Be it known that I, WILLIAM CURRY STEPHENSON, residing at Rocky Mount, in the county of Edgecombe and State of North Carolina, have invented a new and Improved Tool-Holder, of which the following is a specification.

My invention has reference to holders for metal working tools, particularly for tools used in boring, and which includes means for rigidly holding the tools on the tool post for presenting such tools to work in any desired position.

Among other objects this invention, in the nature of a combined boring and turning tool holder, seeks to provide a tool bar holder that will remain rigid on the tool post holder while heavy cuts are being taken and one that will finish a bushing or any similar job complete, without removing the tool holder from the machine.

With other objects in view, my invention embodies, in a tool holder of the character described, the peculiar construction and novel combination of the parts hereinafter explained, specifically pointed out in the appended claims and illustrated in the accompanying drawing, in which:

Figure 1 is a perspective view of my tool holder, the tool carrying bar being operatively applied thereon.

Fig. 2 is a cross section of the holder taken substantially on the line 2—2 on Fig. 1.

Fig. 3 illustrates a split bushing for holding a tool bar of a smaller diameter than that shown in Figs. 1 and 2.

Fig. 4 is a longitudinal section of a modified form of the split bushing shown in Fig. 3 and as applied to a tapered shank of a boring or cutting tool.

Fig. 5 is a perspective view that illustrates the tool holding bar with the tool in a position reverse to that shown in Fig. 1 and the said bar and the cutting tool is rigidly held for operation when the work is to be turned on the outside.

Fig. 6 is a detail perspective view of the clamping screw and the tool post holder socket engaged thereby, and Fig. 7 is a detail perspective view of a boring tool and the holding sleeve hereinafter referred to.

In carrying out my invention, I provide a holder in the nature of a steel body or block 1 that is mounted on the tool slide of the lathe carrier in the same place where the usual tool post is mounted, the latter being removed when my holder is to be applied for use.

Block 1, at one side along the upper edge thereof, has a longitudinal bore 2 of uniform diameter throughout in which the tool holding bar 3 is received and held when the several parts are assembled for use, as shown in Fig. 1.

The bore 2 communicates with a horizontal slot 4 that extends the full length of the body of the block 1 and through one side thereof, as is clearly shown in Figs. 1 and 2, from which it will be observed the said slot 4 and the bore 2 are so positioned in the body or block 1 that, when the holder is set up for use, they come into line with the dead center of the lathe to thereby provide for accurate cutting and boring.

Block 1 has a vertical bore 6 that extends through the upper or springy part thereof and down through the block, the lower part thereof terminating in an enlarged socket 60 which extends through the bottom of the block 1 and the purpose of which will presently appear.

8 designates the tool post holder and, in the construction shown, the same includes a clamping base 80 and a hub 81 that fits up into the socket 60 of the head block, when the parts are operatively assembled, and the said hub 81 has an axial internally threaded bore 82 which extends the full height thereof and is provided for receiving the threaded end 90 of a clamping screw 9 that loosely fits the bore 6 in the head block, and which, when screwed home, closes the upper or spring portion of the block 1 down toward the opposite or fixed abutment of the said head and effects the clamping of the tool bar 3 in the bore 2 and the member 8 of the tool post against the lathe tool slide 85.

The tool bar, shown in Fig. 1, is of the usual type and has the usual means for holding the cutter devices in the boring tool head 11, that is removably mounted on the outer end of the tool bar, it being understood that, when a tool bar of the kind shown in Fig. 1 and of less diameter than the bore 2 is to be rigidly held to the work, a split sleeve or bushing 12, shown in detail in Fig. 3, is placed on the bar to snugly fit the bore 2 and thereby be firmly gripped, when the screw thresher is applied and, when a boring tool 73 having a tapered shank 72 is to be used, a split sleeve 70 having a tapering bore 71 is substituted for the straight sleeve 12, as is clearly shown in Fig. 4.

When the work to be done has to be turned on the outside, the tool is reversed in the tool bar and, since the tool holding member 11 is attached to the bar 3 proper, in practice, by right hand threads, it follows that if the tool is applied for outside work with the tool bar projected as in Fig. 1, the tool would become loose from the bar by unscrewing.

To provide a simple and effective way for holding the tool and the tool bar secure and solid and from turning loose, the head block is formed with a transverse channel or socket 15 in one end thereof that bisects the bore 3 and alines the slot 4 as in the said head block, as is clearly shown in Fig. 5, from which it will be also noticed that the tool receiving member 11 of the tool bar has a transverse aperture 31 that receives and holds the tool in a plane at right angles to the bar 3 and in position for seating in the channel or socket 15, when the tool is set for use for cutting outside work, the head block 1 during this arrangement acting as a tool post, prevents the tool from turning loose and from breaking, when making a heavy cut.

What I claim is:

1. A tool holder of the character described that comprises a head block having a horizontal bore that extends lengthwise therethrough and is adapted for receiving the tool holding bar therein, the said block having a horizontal slot extending the full length thereof that merges with the tool bar receiving bore, and a vertical bore that extends the full height of the block and terminates at the lower end in an enlarged socket, a tool post holder having a threaded central bore, a slide base, the said holder and the head block having opposing portions for clamping onto the slide base and a clamp screw that loosely fits the vertical bore of the head block, the said screw including a clamping head for engaging the top of the head block and a threaded shank for engaging the threaded bore of the tool post holder.

2. A head block for lathes having a split tool bar receiving bore and a transverse tool receiving recess in one end thereof that bisects the said tool bar receiving bore.

WILLIAM CURRY STEPHENSON.

Copies of this patent may be obtained for five cents each, by addressing the "Commissioner of Patents, Washington, D. C."